US011427066B1

(12) United States Patent
Hirano et al.

(10) Patent No.: US 11,427,066 B1
(45) Date of Patent: Aug. 30, 2022

(54) DOOR STRUCTURE

(71) Applicant: HONDA MOTOR CO., LTD., Tokyo (JP)

(72) Inventors: Eiji Hirano, Wako (JP); Takayuki Soma, Wako (JP); Masahiro Tanigawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/197,801

(22) Filed: Mar. 10, 2021

(51) Int. Cl.
*B60J 10/86* (2016.01)
*B60J 5/04* (2006.01)

(52) U.S. Cl.
CPC ............. *B60J 10/86* (2016.02); *B60J 5/0413* (2013.01); *B60J 5/0415* (2013.01)

(58) Field of Classification Search
CPC ........ B60J 10/86; B60J 5/0413; B60J 5/0415; B60J 10/24; B60J 10/30; E05C 17/085
See application file for complete search history.

(56) References Cited

U.S. PATENT DOCUMENTS

| | | | | |
|---|---|---|---|---|
| 4,662,115 A * | 5/1987 | Ohya | ..................... | B60J 5/0481 49/502 |
| 5,822,927 A * | 10/1998 | Hellenkamp | .......... | B60J 5/0413 49/502 |
| 6,969,107 B2 * | 11/2005 | Omori | .................... | B60J 5/0461 296/187.12 |
| 9,168,813 B2 * | 10/2015 | Kasuya | ..................... | E06B 7/14 |
| 2006/0230686 A1 * | 10/2006 | Plum | ....................... | B60J 10/45 49/489.1 |
| 2007/0039245 A1 | 2/2007 | Buchta et al. | | |
| 2007/0187988 A1 * | 8/2007 | Koshimichi | ............. | B60J 10/24 296/146.9 |
| 2008/0258495 A1 * | 10/2008 | Fuetterer | ............... | B60J 5/0418 296/146.5 |
| 2008/0282616 A1 * | 11/2008 | Eguchi | ..................... | B60J 10/30 49/489.1 |
| 2012/0153666 A1 * | 6/2012 | Mori | ....................... | B60J 10/86 49/498.1 |
| 2014/0049067 A1 * | 2/2014 | Kasuya | .................... | B60J 10/30 49/476.1 |
| 2018/0086188 A1 * | 3/2018 | Tamao | ................... | B60J 5/0418 |
| 2019/0100084 A1 * | 4/2019 | Otsuka | .................. | B21D 22/26 |

FOREIGN PATENT DOCUMENTS

JP          2007-508186 A          4/2007

* cited by examiner

*Primary Examiner* — Justin B Rephann
(74) *Attorney, Agent, or Firm* — Rankin, Hill & Clark LLP

(57) ABSTRACT

A door structure includes an outer panel and an inner panel. The inner panel is formed from a panel inner member located on an inner side of a vehicle interior and a panel outer member located on an outer side of the vehicle interior. A sealing member which comes into contact with an A pillar serving as a body side member and isolates the inner side of the vehicle interior from the outer side of the vehicle interior is attached to the panel inner member at an overlap portion serving as a junction between the panel outer member and the panel inner member.

4 Claims, 6 Drawing Sheets

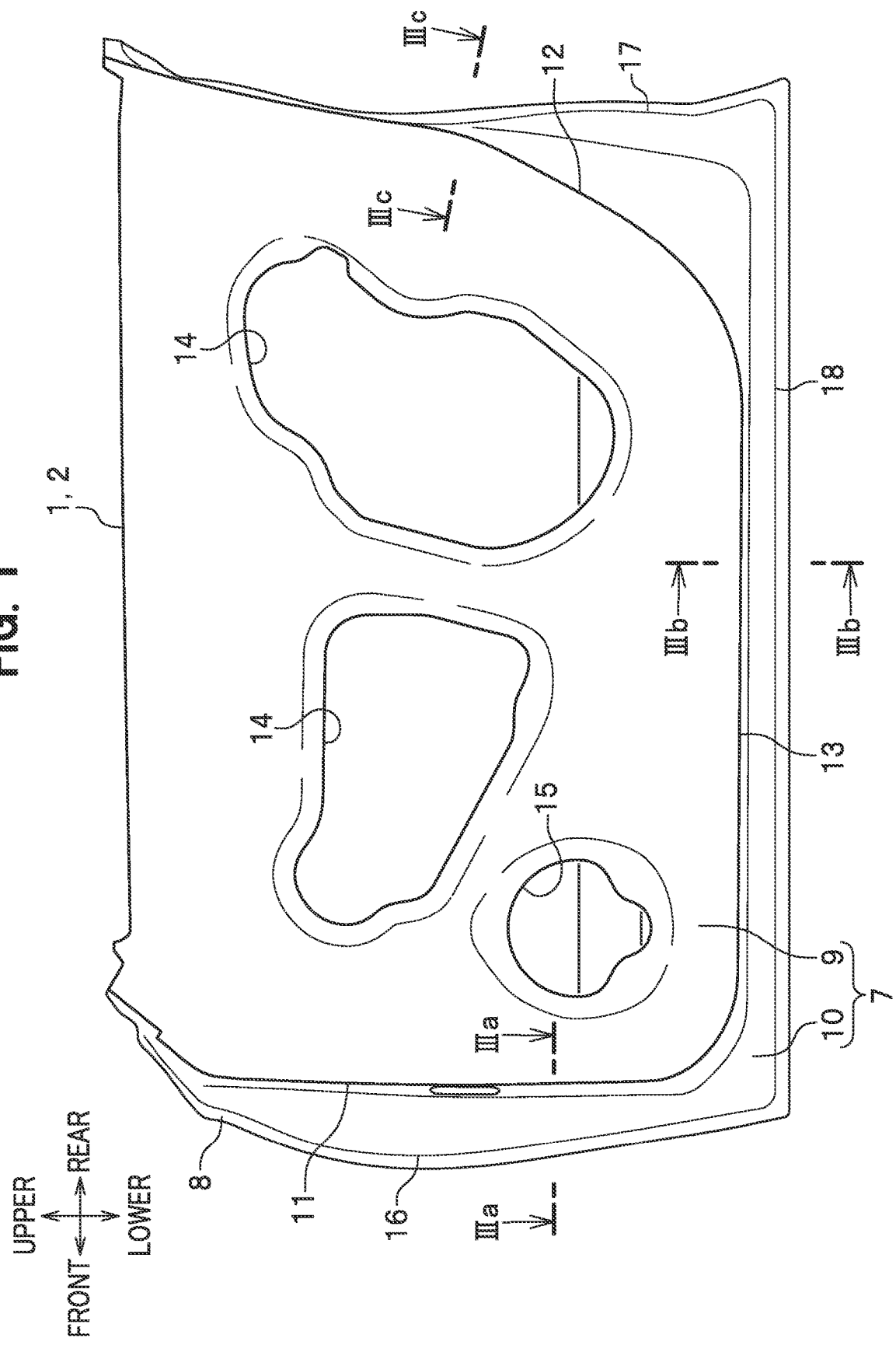

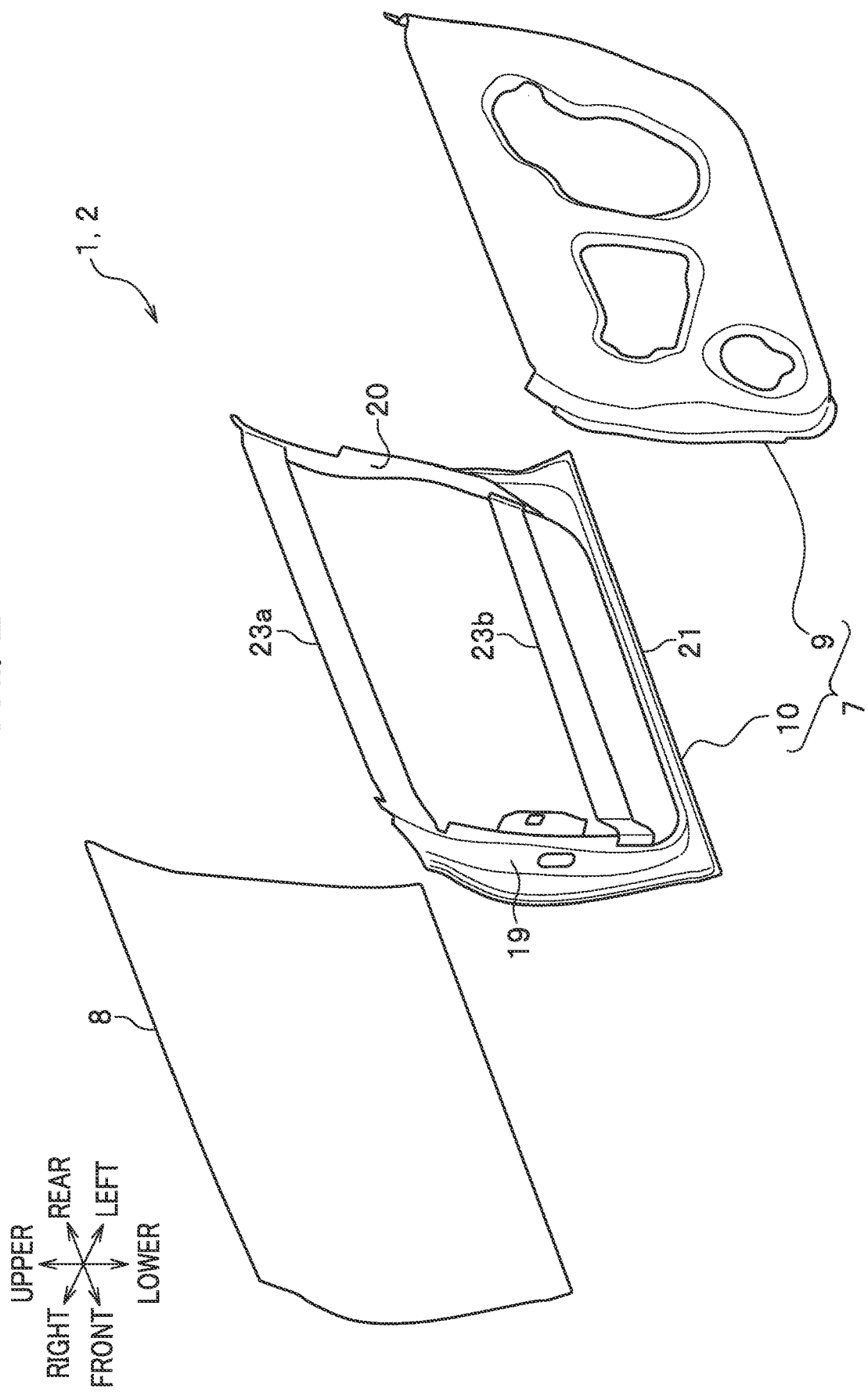

DOOR STRUCTURE

BACKGROUND OF THE INVENTION

1. Field of the Invention

The present invention relates to a door structure.

2. Description of the Related Art

A configuration to arrange a structural reinforcement panel between a substantially flat metal panel located on an outer side of a vehicle interior and a substantially U-shaped metal panel located on an inner side of the vehicle interior has heretofore been known as a conventional door structure (see Patent Literature 1, for example).

According to this door structure, it is possible to reduce thicknesses of the respective inner and outer metal panels, thereby reducing a weight of a door and saving material costs.

PRIOR ART DOCUMENT(S)

[Patent Literature(s)]
  Patent Literature 1: JP 2007-508186 A

SUMMARY OF THE INVENTION

However, the conventional door structure (see Patent Literature 1, for example) does not take into account a drainage treatment for rainwater or car wash water that may get in between the inner and outer metal panels. For this reason, the conventional door structure has a risk of allowing water that leaks out of a junction between divided panels such as the set of the structural reinforcement panel and the inner metal panel to get into a vehicle interior.

Given the situation, it is an object of the present invention to provide a door structure that prevents water that leaks out of a junction between divided panels from getting into a vehicle interior.

To attain the object, a door structure according to an aspect of the present invention provides a door structure including an outer panel and an inner panel, in which the inner panel is formed from a panel inner member located on an inner side of a vehicle interior and a panel outer member located on an outer side of the vehicle interior. Moreover, a sealing member configured to come into contact with a body side member and to isolate the inner side of the vehicle interior from the outer side of the vehicle interior is attached to the panel inner member at a portion near a junction between the panel outer member and the panel inner member.

According to the door structure of the present invention, it is possible to prevent water that leaks out of a junction between divided panels from getting into a vehicle interior.

BRIEF DESCRIPTION OF THE DRAWINGS

FIG. 1 is a side view of a vehicle door applying a door structure according to an embodiment of the present invention.

FIG. 2 is an exploded perspective view of the vehicle door applying the door structure according to the embodiment of the present invention.

DETAILED DESCRIPTION OF THE EMBODIMENTS

Figure 3A:
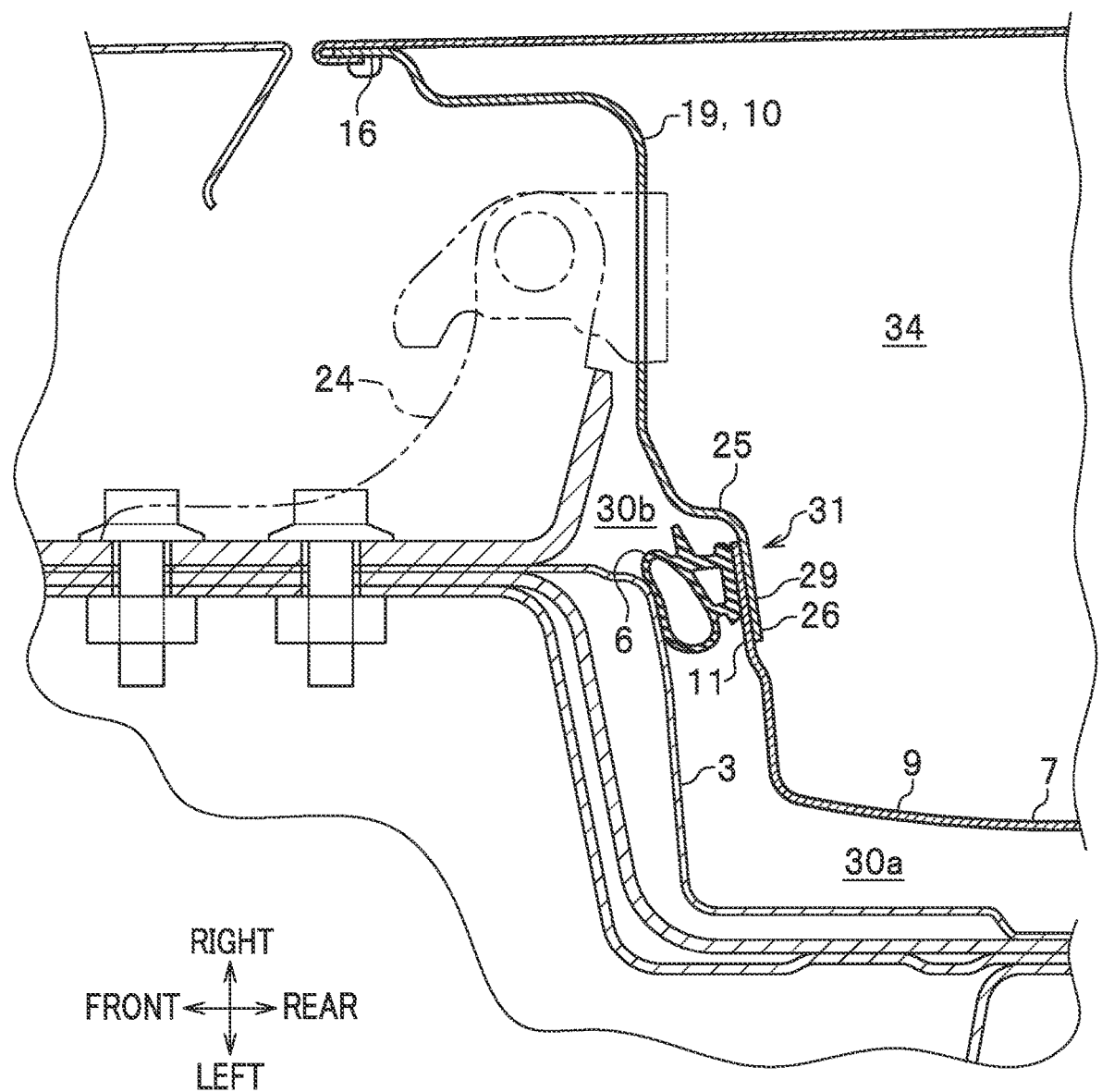
FIG. 3A is a cross-sectional view taken along the IIIa-IIIa line in FIG. 1.

Next, a door structure of a mode for carrying out the present invention (this embodiment) will be described in detail.

FIG. 1 is a side view of a side door 2 on a right side of a vehicle applying a door structure 1 of this embodiment, which is viewed from an inner side of a vehicle interior. FIG. 2 is an exploded perspective view of the side door 2 applying the door structure 1 of this embodiment. Note that front, rear, upper, lower, right, and left directions in this embodiment coincide with front, rear, upper, lower, right, and left directions of the vehicle.

In the following, a description will be given only of the door structure 1 applied to the side door 2 on the right side of the vehicle while omitting a description of a door structure to be applied to a side door 2 on the left side of the vehicle which has a structure symmetric to the aforementioned structure with respect to a center axis of the vehicle.

Although illustration is omitted, the side door 2 shown in 1 which applies the door structure 1 of this embodiment is attached to a vehicle body side by using a hinge so as to open and close an opening on a side part of the vehicle.

As shown in FIGS. 1 and 2, the side door 2 includes an inner panel 7 and an outer panel 8 that is located on an outer side in a vehicle width direction relative to this inner panel 7. Incidentally, the outer panel 8 of this embodiment is assumed to be located at a given space from the inner panel 7 and joined by hemming to a rim of the inner panel 7.

As shown in FIG. 2, the inner panel 7 is formed from two separate members, namely, a panel inner member 9 located on an inner side of the vehicle interior (the left side of FIG. 2) and a panel outer member 10 located on an outer side of the vehicle interior (the right side of FIG. 2).

The panel inner member 9 is formed to have narrower widths in a front-rear direction and an upper-lower direction as compared to relevant widths of the panel outer member 10 in lateral view of the side door 2 shown in FIG. 1. Specifically, a front edge 11 of the panel inner member 9 is shifted rearward from a front edge 16 of the panel outer member 10. A rear edge 12 of the panel inner member 9 is shifted forward from a rear edge 17 of the panel outer member 10. A lower edge 13 of the panel inner member 9 is shifted upward from a lower edge 18 of the panel outer member 10.

The above-described panel inner member 9 is provided with two work holes 14 that allow access to a door hollow portion, and a speaker attachment hole 15.

Note that the panel inner member 9 of this embodiment can be obtained in accordance with an ordinary press forming method.

As shown in FIG. 2, the panel outer member 10 includes a hinged longitudinal side portion 19, a hingeless longitudinal side portion 20, and a lower side portion 21.

The hinged longitudinal side portion 19 extends in the upper-lower direction on a front side of the side door 2. A hinge (not illustrated) is attached to this hinged longitudinal side portion 19.

The hingeless longitudinal side portion 20 extends in the upper-lower direction on a rear side of the side door 2 in such a way as to be parallel to the hinged longitudinal side portion 19.

The lower side portion 21 extends in the front-rear direction in such a way as to connect lower end portions of the hinged longitudinal side portion 19 and the hingeless longitudinal side portion 20 to each other.

The panel outer member 10 of this embodiment is assumed to be obtained by integrating the hinged longitudinal side portion 19, the hingeless longitudinal side portion 20, and the lower side portion 21 together by in accordance with a hot press forming method.

A reinforcement member 23a that connects upper end portions of the hinged longitudinal side portion 19 and the hingeless longitudinal side portion 20 to each other and a reinforcement member 23b that connects intermediate portions of the hinged longitudinal side portion 19 and the hingeless longitudinal side portion 20 to each other are arranged on the above-described panel outer member 10.

Figure 3B:
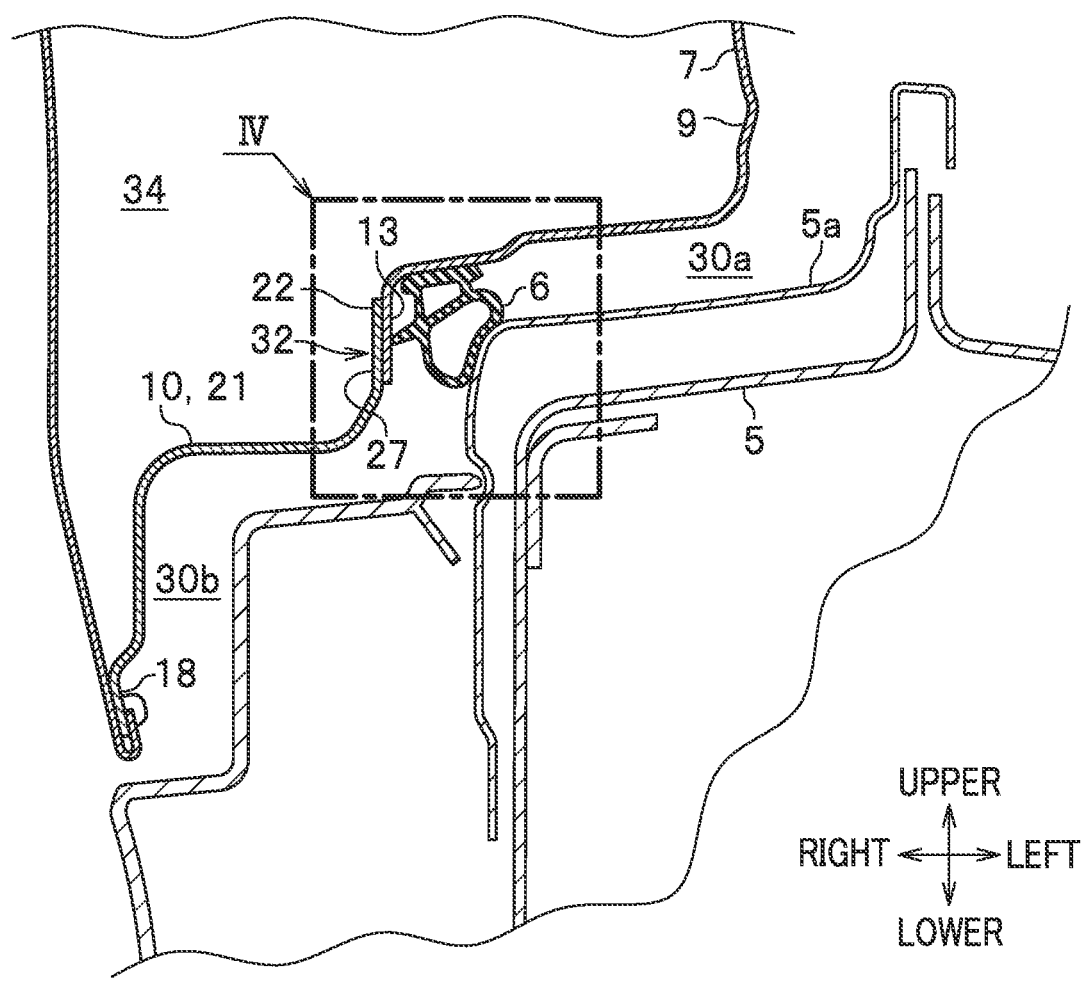
FIG. 3B is a cross-sectional view taken along the IIIb-IIIb line in FIG. 1.
Figure 3C:
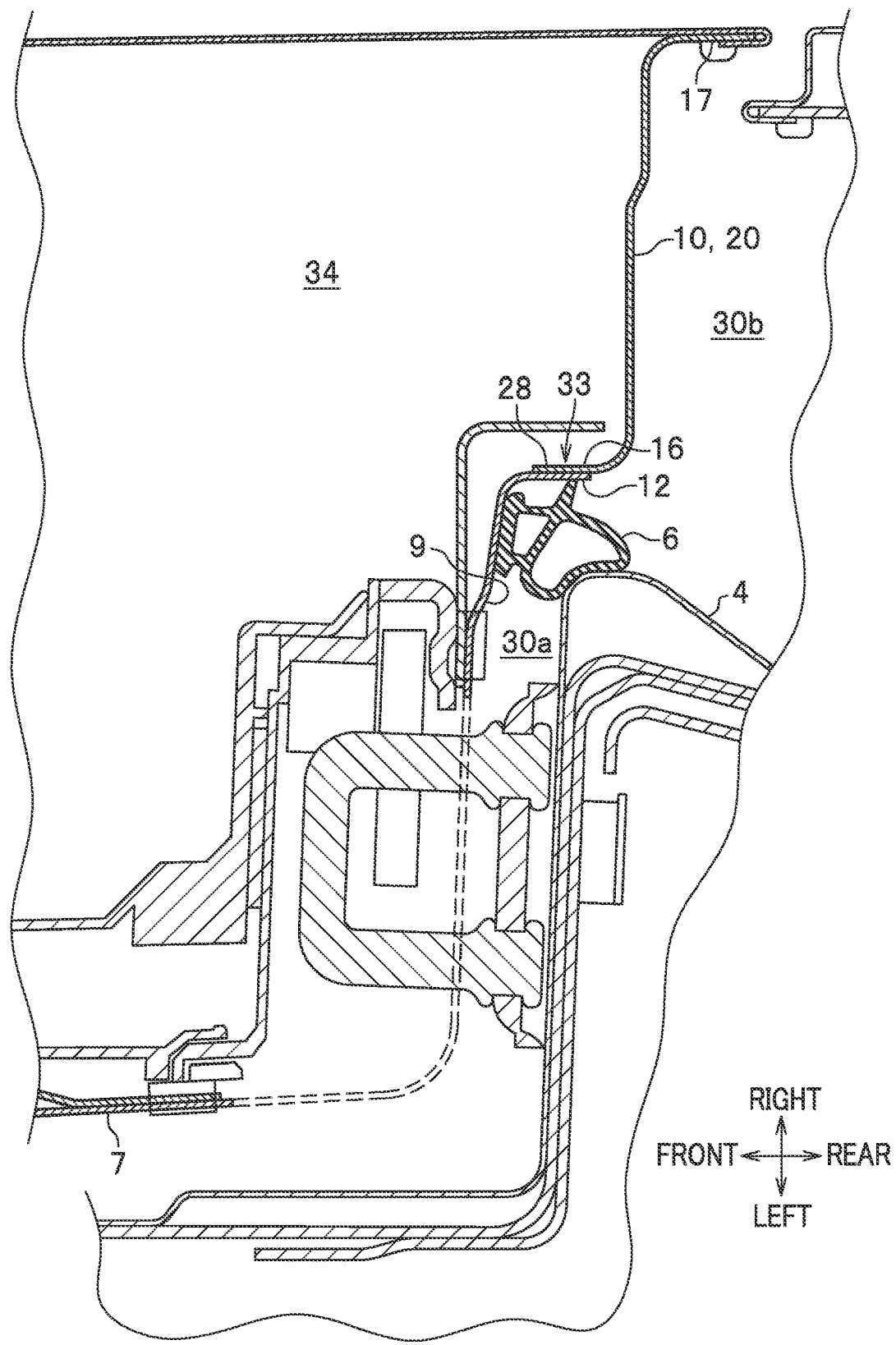
FIG. 3C is a cross-sectional view taken along the IIIc-IIIc line in FIG. 1.

FIG. 3A is a cross-sectional view taken along the IIIa-IIIa line in FIG. 1. FIG. 3B is a cross-sectional view taken along the IIIb-IIIb line in FIG. 1. FIG. 3C is a cross-sectional view taken along the IIIc-IIIc line in FIG. 1. Note that a hinge 24 attached between an A pillar 3 and the hinged longitudinal side portion 19 is indicated with phantom lines (chain double-dashed lines) in FIG. 3A.

As shown in FIG. 3A, the panel outer member 10 extends inward in the vehicle width direction (the left side of FIG. 3A) from the front edge 16 of the panel outer member 10 formed from the hinged longitudinal side portion 19, thus forming an inner edge 29 of the panel outer member 10. This inner edge 29 of the panel outer member 10 constitutes an overlap portion 31 to overlap the front edge 11 of the panel inner member 9.

To be more precise, the hinged longitudinal side portion 19 includes a flange portion 25, which bends and extends rearward in the middle of bending and extending toward the inner side in the vehicle width direction (the left side of FIG. 3A). The hinged longitudinal side portion 19 includes an extending portion 26, which further extends toward the inner side in the vehicle width direction (the left side of FIG. 3A) via the flange portion 25. The panel outer member 10 forms the overlap portion 31 by using this extending portion 26 and the front edge 11 of the panel inner member 9.

Note that the flange portion 25 in this embodiment extends in the front-rear direction and the upper-lower direction along a door panel flat surface (a general surface of the inner panel 7).

In the above-described overlap portion 31, the front edge 11 of the panel inner member 9 is joined from an outer side in an in-out direction of a door hollow portion 34 to the inner edge 29 of the panel outer member 10. Note that the door hollow portion 34 is formed between the outer panel 8 and the inner panel 7.

The overlap portion 31 of the panel outer member 10 and the panel inner member 9 is bonded by spot welding and the like.

As shown in FIG. 3B, the panel outer member 10 bends and extends from the lower edge 18 of the panel outer member 10 formed from the lower side portion 21 toward the inner side in the vehicle width direction (the left side of FIG. 3B), thus forming an upper edge 22 of the panel outer member 10. The panel outer member 10 forms an overlap portion 32 by using this upper edge 22 and the lower edge 13 of the panel inner member 9.

To be more precise, the lower side portion 21 includes a flange portion 27 (the upper edge), which bends and extends upward in the middle of extending toward the inner side in the vehicle width direction (the left side of FIG. 3B). The panel outer member 10 forms the overlap portion 32 by using this flange portion 27 and the lower edge 13 of the panel inner member 9.

Note that the flange portion 27 in this embodiment extends in the front-rear direction and the upper-lower direction along the door panel flat surface (the general surface of the inner panel 7).

In the above-described overlap portion 32, the lower edge 13 of the panel inner member 9 is joined from the outer side in the in-out direction of the door hollow portion 34 to the upper edge 22 of the panel outer member 10.

The overlap portion 32 of the panel outer member 10 and the panel inner member 9 is bonded by spot welding and the like.

Meanwhile, as shown in FIG. 3C, the panel outer member 10 includes a flange portion 28 (an inner edge), which bends and extends forward in the middle of bending and extending from the rear edge 17 of the panel outer member 10 formed from the hingeless longitudinal side portion 20 toward the inner side in the vehicle width direction (the left side of FIG. 3C). The hingeless longitudinal side portion 20 forms an overlap portion 33 by using this flange portion 28 and the rear edge 12 of the panel inner member 9.

Note that the flange portion 28 in this embodiment extends in the front-rear direction and the upper-lower direction along the door panel flat surface (the general surface of the inner panel 7).

In the above-described overlap portion 33, the rear edge 12 of the panel inner member 9 is joined from the outer side in the in-out direction of the door hollow portion 34 to the flange portion 28.

The overlap portion 33 of the panel outer member 10 and the panel inner member 9 is bonded by spot welding and the like.

As described below, the door structure 1 (see FIG. 1) of this embodiment includes a sealing member 6 (see FIGS. 3A to 3C) in a hollowed tube shape made of a rubber elastic body and configured to seal a space between the side door 2 (see FIG. 1) in a closed state and a body side member that surrounds an opening of a vehicle side portion.

As shown in FIG. 3A, the sealing member 6 on the front side of the side door 2 (see FIG. 1) is arranged at the overlap portion 31 which is a junction between the panel outer member 10 and the panel inner member 9. This sealing member 6 is fixed to the front edge 11 of the panel inner member 9 and is in contact with the A pillar 3 being the body side member. Thus, the sealing member 6 isolates an inner side 30a of the vehicle interior from an outer side 30b of the vehicle interior.

As shown in FIG. 3B, the sealing member 6 on the lower side of the side door 2 (see FIG. 1) is arranged adjacent to the overlap portion 32 which is the junction between the panel outer member 10 and the panel inner member 9. This sealing member 6 is fixed to the lower edge 13 of the panel inner member 9 and is in contact with a body outer member 5a of a side sill 5 being the body side member. Thus, the sealing member 6 isolates the inner side 30a of the vehicle interior from the outer side 30b of the vehicle interior.

As shown in FIG. 3C, the sealing member 6 on the rear side of the side door 2 (see FIG. 1) is arranged adjacent to the overlap portion 33 which is the junction between the panel outer member 10 and the panel inner member 9. This sealing member 6 is fixed to the rear edge 12 of the panel inner member 9 and is in contact with a B pillar 4 being the body side member. Thus, the sealing member 6 isolates the inner side 30a of the vehicle interior from the outer side 30b of the vehicle interior.

<Operation and Effect>

Next, the operation and effect of the door structure 1 of this embodiment will be described.

The sealing member 6 of the door structure 1 of this embodiment is arranged in the space between the side door 2 and the body side member such as the A pillar 3, the B pillar 4, and the body outer member 5a, thus isolating the inner side 30a of the vehicle interior from the outer side 30b of the vehicle interior. Moreover, the sealing member 6 is attached to the panel inner member 9 side (see FIGS. 3A, 3B, and 3C) at the overlap portion 31 (see FIG. 3A) being the junction between the panel outer member 10 and the panel inner member 9, or at the location adjacent to any of the overlap portions 32 and 33 (see FIGS. 3B and 3C).

In the above-described door structure 1, water such as rainwater and car wash water may get into the door hollow portion 34 from a gap between the upper edge of the panel outer member 10 and the upper edge of the panel inner member 9, which serves as a hatchway for window glass (not illustrated). The water getting into the door hollow portion 34 flows downward on an inner wall surface of panel outer member 10 and on an inner wall surface of the panel inner member 9.

Figure 4:
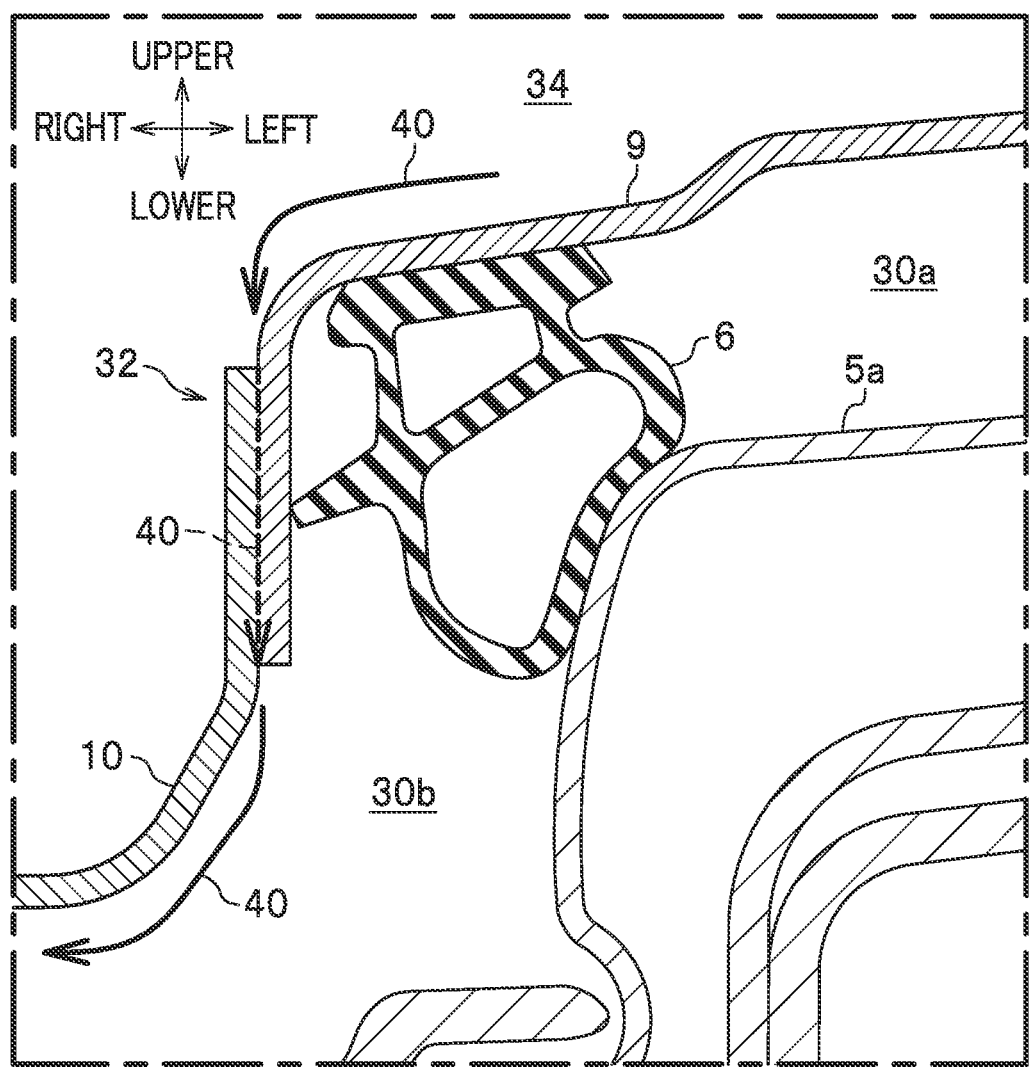
FIG. 4 is a partially enlarged diagram of a portion IV in FIG. 3B.

FIG. 4 is a partial enlarged diagram of a portion IV in FIG. 3B.

As illustrated in FIG. 4, at a lower part of the door hollow portion 34, water 40 in the door hollow portion 34 flows from the overlap portion 32 of the panel inner member 9 and the panel outer member 10 to the outside of the door hollow portion 34.

Since the sealing member 6 is attached to the panel inner member 9 side in the door structure 1 of this embodiment, it is possible to prevent the water 40 from getting into the inner side 30a of the vehicle interior.

Meanwhile, in this door structure 1, the front edge 11 (see FIG. 3A), the lower edge 13 (see FIG. 3B), and the rear edge 12 (see FIG. 3C) constituting the edges of the panel inner member 9 are joined from the outer side in the in-out direction of the door hollow portion 34 to the inner edge 29 (see FIG. 3A), the flange portion 27 (see FIG. 3B), and the flange portion 28 (see FIG. 3C) constituting the edges of the panel outer member 10 corresponding thereto, respectively.

According to the above-described door structure 1, unlike the one in which the edges of the panel outer member 10 are joined from the outer side of the door hollow portion 34, the water 40 in the door hollow portion 34 flows to the outside of the door hollow portion 34 more reliably as illustrated in FIG. 4.

Meanwhile, in this door structure 1, the flange portion 28 of the hingeless longitudinal side portion 20 and the flange portion 27 of the lower side portion 21 form the overlap portions 32 and 33 with the panel inner member 9, respectively. In the meantime, the extending portion 26 of the hinged longitudinal side portion 19 forms the overlap portion 31 with the panel inner member 9.

According to the above-described door structure 1, the junction between the panel inner member 9 and the panel outer member 10 can be formed by overlapping two members. As a consequence, the overlap portions 31, 32, and 33 constitute reinforcement portions per se so that rigidity of the panel inner member 9 can be enhanced.

In the meantime, according to this door structure 1, portions around the highly rigid overlap portions 31, 32, and 33 can receive a pressure load from the body side member via the sealing member 6 when closing the side door 2. Accordingly, the door structure 1 can avoid deformation of the inner panel 7 when closing the side door 2.

Meanwhile, in this door structure 1, the sealing member 6 is fixed to the overlap portion 31.

According to the above-described door structure 1, the load to be inputted from the body side member via the sealing member 6 when closing the side door 2 can be received by the overlap portion 31 by itself. Thus, the door structure 1 can more reliably avoid the deformation of the inner panel 7 due to the pressure load when closing the side door 2. Moreover, the overlap portion 31 significantly exerts this function to suppress the deformation of the overlap portion 31 that receives the pressure load from the body side member (the A pillar 3) by using the surface opposed to the body side member.

Meanwhile, of the panel outer member 10 and the panel inner member 9 in this door structure 1, at least the panel outer member 10 is a hot press formed member.

The panel outer member 10 of the door structure 1 described above has higher strength as compared to a panel outer member 10 obtained in accordance with the ordinary press forming method. Note that the panel inner member 9 of this embodiment is assumed to be the ordinary hot pressed member. However, the panel inner member 9 may be a hot press formed member instead.

While the embodiment of the present invention has been described above, the present invention is not limited only to this embodiment and can be embodied in various other modes.

What is claimed is:

1. A door structure comprising:
an outer panel; and
an inner panel, wherein
the inner panel is formed from a panel inner member located on an inner side of a vehicle interior and a panel outer member located on an outer side of the vehicle interior,
a sealing member configured to come into contact with a body side member and to isolate the inner side of the vehicle interior from the outer side of the vehicle interior is attached to the panel inner member at a portion near a junction between the panel outer member and the panel inner member,
the panel outer member includes:
a hinged longitudinal side portion to which a hinge is attached;
a hingeless longitudinal side portion arranged parallel to the hinged longitudinal side portion;
a lower side portion connecting lower end portions of the hinged longitudinal side portion and the hingeless longitudinal side portion to each other;
flange portions extending across the hinged longitudinal side portion, the lower side portion, and the hingeless longitudinal side portion along a door panel flat surface; and
an extending portion extending in a vehicle width direction from the flange portion of the hinged longitudinal side portion,
each of the flange portion of the hingeless longitudinal side portion and the flange portion of the lower side portion forms an overlap portion with the panel inner member, and
the extending portion of the hinged longitudinal side portion forms an overlap portion with the panel inner member.

2. The door structure according to claim 1, wherein
at an overlap portion of the panel inner member and the panel outer member, an edge of the panel inner member is joined to an edge of the panel outer member from an outer side in an in-out direction of a door hollow portion formed from the outer panel and the inner panel.

3. The door structure according to claim 1, wherein
the sealing member is attached to each overlap portion of the panel inner member and the panel outer member.

4. The door structure according to claim 1, wherein
of the panel outer member and the panel inner member, at least the panel outer member is a hot press formed member.

\* \* \* \* \*